United States Patent [19]

Sakakiyama

[11] Patent Number: 5,890,991
[45] Date of Patent: Apr. 6, 1999

[54] CONTROL SYSTEM AND METHOD OF CONTINUOUSLY VARIABLE TRANSMISSION

[75] Inventor: Ryuzo Sakakiyama, Tokyo, Japan

[73] Assignee: Fuji Jukogyo Kabushiki Kaisha, Tokyo, Japan

[21] Appl. No.: 779,670

[22] Filed: Jan. 7, 1997

[30] Foreign Application Priority Data

Feb. 20, 1996 [JP] Japan .................................. 8-056947

[51] Int. Cl.$^6$ .............................................. F16H 61/00
[52] U.S. Cl. ............................ 477/48; 477/46; 701/52; 701/54
[58] Field of Search ................................ 477/37, 44, 46, 477/48; 701/51, 52, 53, 54, 55

[56] References Cited

U.S. PATENT DOCUMENTS

| | | | |
|---|---|---|---|
| 4,354,401 | 10/1982 | Omitsu | 477/38 |
| 4,947,953 | 8/1990 | Morimoto | 477/47 X |
| 5,033,571 | 7/1991 | Morimoto | 477/42 X |
| 5,094,129 | 3/1992 | Sugaya et al. | 477/48 |
| 5,127,288 | 7/1992 | Hojo et al. | 701/52 X |
| 5,203,235 | 4/1993 | Iizuka | 701/51 X |
| 5,351,570 | 10/1994 | Mizunuma et al. | 477/122 X |
| 5,364,321 | 11/1994 | Togai et al. | 477/42 |
| 5,527,231 | 6/1996 | Seidel et al. | 477/48 X |
| 5,527,232 | 6/1996 | Seidel et al. | 477/46 |
| 5,609,544 | 3/1997 | Lardy et al. | 477/46 |
| 5,636,120 | 6/1997 | Yesel et al. | 701/51 |
| 5,655,991 | 8/1997 | Lardy et al. | 477/48 X |
| 5,685,800 | 11/1997 | Toukura | 477/38 X |

FOREIGN PATENT DOCUMENTS

| | | |
|---|---|---|
| 658399 | 3/1994 | Japan . |
| 9300531 | 1/1993 | WIPO . |

*Primary Examiner*—Dirk Wright
*Assistant Examiner*—Peter T. Kwon
*Attorney, Agent, or Firm*—Martin A. Farber

[57] ABSTRACT

A control system of a vehicular continuously variable transmission having a manual transmission mode comprises speed ratio changing when a manual transmission mode is chosen and a speed range is manually selected for changing a speed ratio of the selected speed range in the up-shift direction as the engine speed becomes high on the side of low speed ranges and in the down-shift direction as the vehicle speed becomes high on the side of high speed ranges. Further, in the manual transmission mode, when the engine speed reaches a lower limit value without making a down-shift, the speed ratio is controlled so as to hold the engine speed at the lower limit value. Thus constituted continuously variable transmission provides a vehicle with miscellaneous advantages such as an easy handling, smooth acceleration/deceleration performance, extended maximum speed and the like when the manual transmission mode is selected.

15 Claims, 4 Drawing Sheets

CONTROL SYSTEM AND METHOD OF CONTINUOUSLY VARIABLE TRANSMISSION

BACKGROUND OF THE INVENTION

1. Field of the Invention

The present invention relates to a control system and method of a vehicular continuously variable transmission having a manual transmission mechanism and more specifically to a modification in the manual transmission mechanism thereof.

2. Prior Art

The continuously variable transmission is generally employed as an automatic transmission capable of changing a speed ratio (transmission ratio) automatically, however it has also a capability of changing a speed ratio by manual operation like a manual transmission. Japanese Patent Application Laid-open No. Toku-Kai-Hei 6-58399 discloses a continuously variable transmission in which a vehicle driver can establish the speed ratio arbitrarily by manual operation. Further, International Patent Application No. PCT/EP 92/01155 discloses a technique I in which a vehicle driver can select a desired speed range (or speed ratio) among several predetermined speed ratios (6 speed ranges) by manual operation.

However, the prior art described above, for example, the technique disclosed in Toku-Kai-Hei 6-58399 involves a problem that it is difficult for the vehicle driver to foresee what degree of acceleration or deceleration is obtained from the speed ratio arbitrarily selected when manually operated. On the other hand, in case of selecting a desired speed range among predetermined fixed speed ranges, this technique is still unsatisfactory from the aspect of power performance and it has a problem that the vehicle driver feels a substantial degree of shift-shock if he or she forgets to perform shift changes.

SUMMARY OF THE INVENTION

Accordingly, the present invention is intended to obviate the disadvantages of the known art and it is an object of the present invention to provide a continuously variable transmission having a manual transmission control mode by which the speed ratio of a manually selected speed range can be changed according to running conditions.

To achieve the object, the control system of a continuously variable transmission according to the present invention comprises:

a change-over switch for outputting a signal when a manual transmission mode is chosen; and speed ratio changing means responsive to the signal for changing a speed ratio of the manually selected speed range in the up-shift direction as the engine speed becomes high on the side of low speed ranges and in the down-shift direction as the vehicle speed becomes high on the side of high speed ranges.

DETAILED DESCRIPTION OF THE PREFERRED EMBODIMENTS

Figure 1:
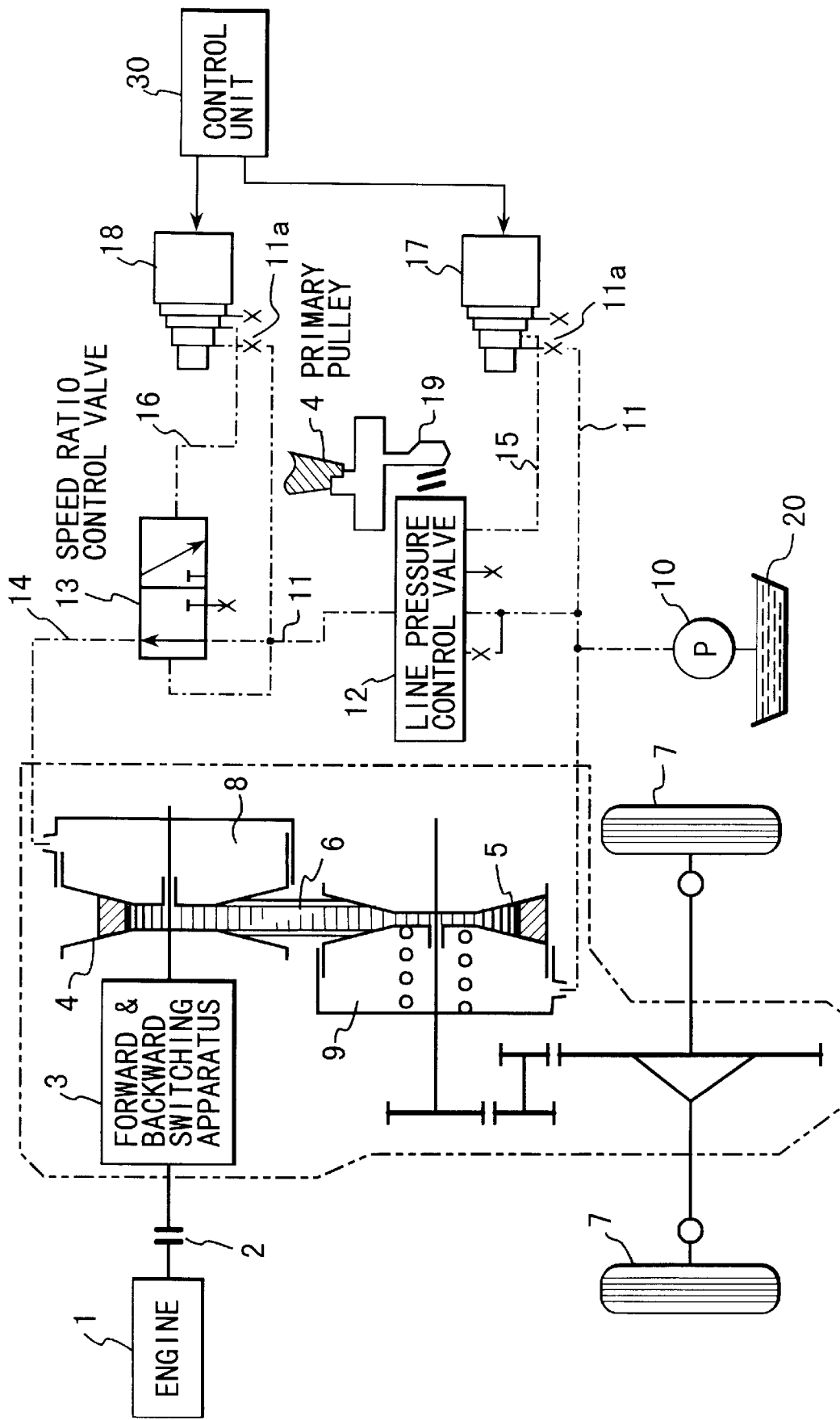
FIG. 1 is a schematic view showing an example of a continuously variable transmission for a vehicle.

Referring now to FIG. 1, numeral 1 denotes an engine, numeral 2 is a clutch (normally electromagnetic powder clutch), numeral 3 a forward and backward switching apparatus, numeral 4 a primary pulley, numeral 5 a secondary pulley, and numeral 6 a drive belt looped over the primary pulley 4 and the secondary pulley 5. Engine torque of the engine 1 is transmitted to the primary pulley 4 through the clutch 2, and the forward and backward switching apparatus 3. Further, torque is transferred to the secondary pulley 5 through the drive belt 6. Further, an output shaft of the secondary-pulley 5 transfers torque through a final reduction gear and a differential apparatus finally to a drive wheel 7. The primary pulley 4 and the secondary pulley 5 have a primary cylinder 8 and a secondary cylinder 9 respectively in order to control the pulley width, so that when the width of one pulley is expanded the width of the other pulley is decreased. When the pulley width is changed, a running diameter of the pulley is changed. Thus, a rotation transmitting ratio, i.e., a speed ratio (transmission ratio) of the primary pulley 4 with respect to the secondary pulley 5 is controlled steplessly.

A hydraulic control system of the continuously variable transmission according to the present invention will be described hereinafter.

A discharge port of an oil pump 10 driven by the engine 1 is communicated with a line pressure passage 11. The line pressure passage 11 is further communicated with the secondary cylinder 9, a line pressure control valve 12 and a speed ratio control valve 13. Further, the speed ratio control valve 13 is connected with the primary cylinder 8 through a passage 14. Further, the line pressure passage 11 is communicated with solenoid operated on-off valve 17, 18 and one side of the speed ratio control valve 13 through an orifice 11a and the line pressure is a pressure source of the solenoid operated on-off valves 17, 18. The solenoid operated on-off valves 17, 18 are controlled by duty signals from a control unit 30 so as to produce a control pressure in the form of pulses. A control pressure from the solenoid operated valve 17 is applied to the line pressure control valve 12 through a passage 15 and a control pressure from the solenoid operated valve 18 is applied to the other side of the speed ratio control valve 13 through a passage 16. The line pressure control valve 12 is connected with a sensor shoe 19 being engaged with the primary pulley 4 for controlling a line pressure according to a speed ratio. Numeral 20 denotes an oil pan for reserving drained oil.

Thus, a line pressure $P_L$ is controlled by the line pressure control valve 12 based on the control pressure from the solenoid operated valve 17 in accordance with the speed ratio i and an engine torque T.

The speed ratio control valve 13 acts as controlling a flow rate Q of the oil supplied to or drained from the primary cylinder 8 by operating a spool between an oil supply position connected with the line pressure passage 11 and an oil drain position for draining oil from the passage 14 based on a degree of the duty ratio in the relationship of the line pressure and the pulse-shaped control pressure generated from the solenoid operated valve 18.

Figure 2:
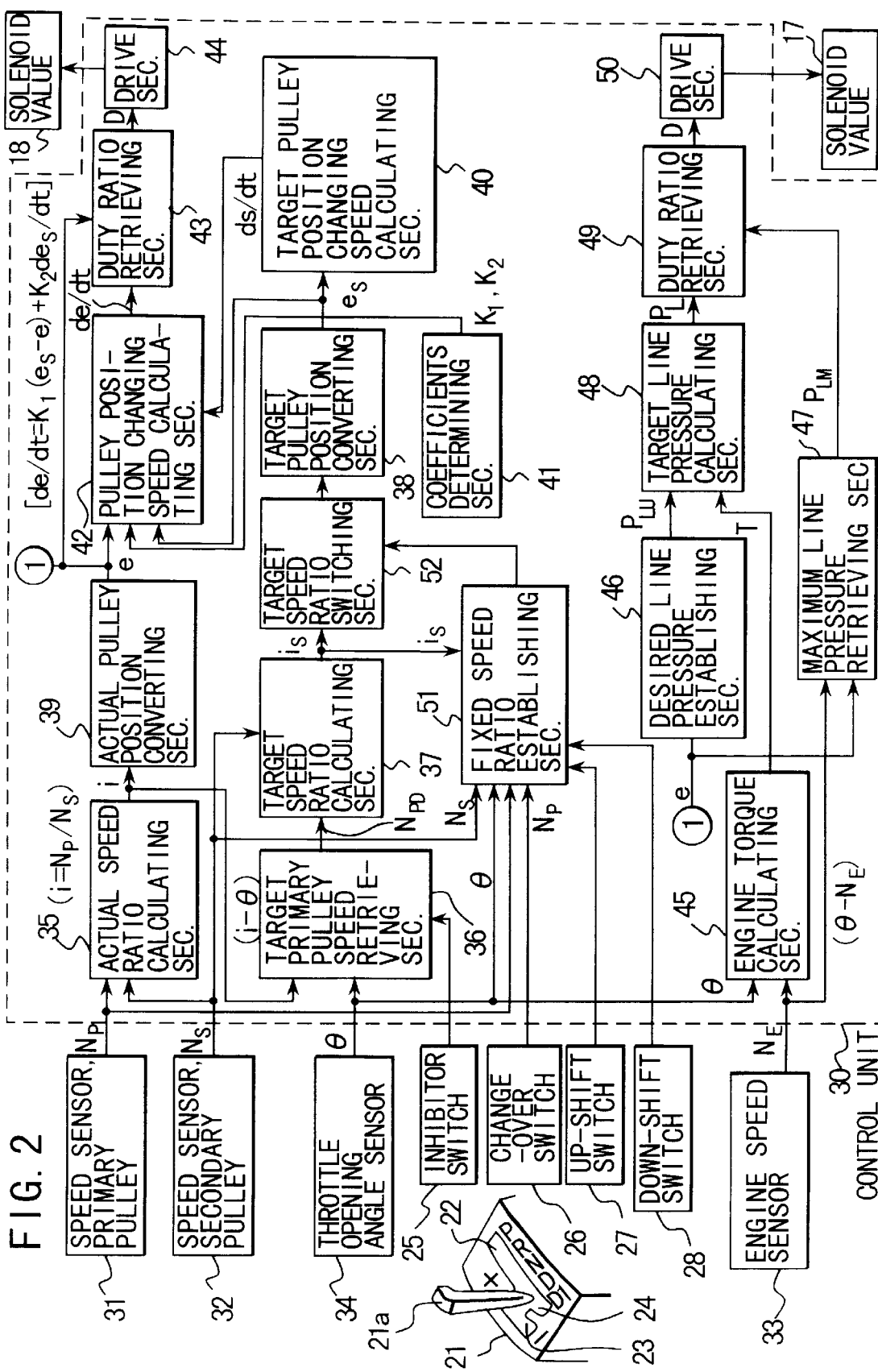
FIG. 2 is a block diagram of a control unit for a continuously variable transmission according to an embodiment of the present invention.

Describing an electronic control system of the control unit 30 by referring to FIG. 2, the control unit 30 receives signals from a primary pulley speed sensor 31 for detecting a revolution speed of the primary pulley 4, a secondary pulley speed sensor 32 for detecting a revolution speed of the secondary pulley 5, an engine speed sensor 33 for detecting an engine rotation speed, a throttle valve opening angle sensor 34 for detecting an opening angle of the throttle valve and from miscellaneous switches of a selector unit 21.

The selector unit 21 has a selector array 22 for an automatic transmission mode (hereinafter referred to as AT mode) and a selector array 23 for a manual transmission mode (hereinafter referred to as MT mode) provided in parallel with the selector array 22. On the selector array 22 for AT mode, selector positions are arranged in a straight line in such a way as "P" (parking), "R" (reverse), "N" (neutral), "D" (drive) and "$D_s$" in this order. Further, the selector unit 21 has an AT-MT gateway 24 in the middle of a line across "D" range position of the selector array 22 and the selector array 23. At the AT-MT gateway 24 there is provided a change-over switch 26 for outputting a change-over signal when a select Lever 21a has passed through the AT-MT gateway 24. Further, on the selector array 23 for MT mode, there are provided an up-shift switch 27 and a down-shift switch 28. The up-shift switch 27 is for generating an up-shift signal when the select lever 21a is operated in the forward direction for example and the down-shift switch 28 is for producing a down-shift signal when the select lever 21a is operated in the backward direction for example. Further, on the selector array 22 for AT mode, there is provided an inhibitor switch 25 for generating a signal to indicate what position the selector lever 21a selects. Those signals from switches 25, 26, 27 and 28 are inputted into the control unit 30.

Describing the control system for AT mode, a detecting signal $N_P$ from the primary pulley speed sensor 31 and a detecting signal $N_S$ from the secondary pulley speed sensor 32 are inputted to an actual speed ratio calculating section 35 wherein an actual speed ratio i is calculated. Signals of this actual speed ratio i and a throttle valve opening angle θ from a throttle opening angle sensor 34 are inputted to a target primary pulley speed retrieving section 36.

The target primary pulley speed retrieving section 36 includes a section for retrieving a target revolution speed of the primary pulley at running positions like D, $D_S$ and R ranges. When the inhibitor switch 25 detects a position of the select lever 21a, a target primary pulley speed $N_{PD}$ is retrieved from the target primary pulley speed retrieving section 36 based on the detecting signal from the inhibitor switch 25 and outputted to a target speed ratio calculating section 37.

In the target speed ratio calculating section 37, a target speed ratio $i_s$ ($i_s=N_{PD}/N_S$) is calculated based on the target primary pulley speed $N_{PD}$ and a secondary pulley speed $N_S$ detected by the secondary pulley speed sensor 32.

Thus, the target primary pulley speed $N_{PD}$ and the target speed ratio is can be obtained on the basis of the shift pattern which is established according to miscellaneous operating conditions, employing the primary pulley speed $N_P$, the secondary pulley speed $N_S$, the throttle opening angle θ and the actual speed ratio $i_s$.

Next, the control of the primary cylinder 8 by the speed ratio control valve 13 will be described.

Since a volume v of the primary cylinder 8 is a function of a pulley position e, the flow rate Q of oil flowing to or from the primary cylinder 8 is expressed as Q=dv/dt=df(e)/dt. That is to say, the flow rate Q has a 1:1 relationship with a changing speed de/dt of the pulley position e. When a duty ratio D is outputted to the speed ratio control valve 13, the flow rate Q is a function of the duty ratio D, a Line pressure $P_L$ and a primary pressure $P_P$. Here, assuming an engine torque to be constant, the line pressure $P_L$ and the primary pressure $P_P$ are a function of the pulley position e corresponding to an actual speed ratio i respectively. Consequently, a relationship of Q=f (D, e) is formed. Since de/dt=f (D, e), a relationship D=f (de/dt, e) is obtained. Hence, the duty ratio D can be determined unconditionally based on the pulley position changing speed de/dt and the actual pulley position e.

On the other hand, the pulley position changing speed de/dt can be expressed as a deviation between a target pulley position $e_s$ and the actual pulley position e. Taking a target pulley position changing speed $de_s/dt$ into consideration in order to increase a convergence speed of a first order lag of a drive system, the pulley position changing speed de/dt is expressed in a following formula:

$$de/dt=K_1(e_s-e)+K_2 \cdot de_s/dt \qquad (1)$$

where $K_1$ and $K_2$ are coefficients.

Since the actual speed ratio i and the target speed ratio can be replaced with the actual pulley position e and the target pulley position $e_s$ respectively, the duty ratio D is determined from the pulley position changing speed de/dt calculated according to the above formula (1).

The actual speed ratio i is inputted to an actual pulley position converting section 39, wherein the actual speed ratio i is converted into the actual pulley position e by referring to a map. The actual pulley position e is determined so that a small value is obtained at a low speed range and a large value is obtained at a high speed range. Further, in the same manner, the target speed ratio $i_s$ is inputted to a target pulley position converting section 38, wherein the target speed ratio $i_s$ is converted into the target pulley position $e_s$ by referring to a map. The target pulley position $e_s$ is determined so that a small value is obtained at a low speed range and a large value is obtained at a high speed range. Signals of the target pulley position $e_s$ are inputted to the target pulley position changing speed calculating section 40 where a target pulley position changing speed $de_s/dt$, namely, a variation $\Delta e_s$ of the target pulley position $e_s$ during a small specified interval $\Delta t$ is calculated. Further, these calculated values of the actual pulley position e, the target pulley position $e_s$, the target pulley position changing speed $de_s/dt$ and the coefficients $K_1$, $K_2$ determined in a coefficients determining section 41 are inputted to a pulley position changing speed calculating section 42 wherein the pulley position changing speed de/dt is calculated in accordance with the formula (1). Signals of the pulley position changing speed calculating section 42 and the actual pulley position converting section 39 are inputted to a duty ratio retrieving section 43.

The duty ratios have been established beforehand on a map prepared in accordance with an aforementioned relationship of D=f (de/dt, e) and the duty ratio D is retrieved from this map based on the pulley position changing speed de/dt and the actual pulley position e. The solenoid operated on/off valve 18 is operated by signals of the duty ratio D through the drive section 44 so as to control the difference between the actual speed ratio i and the target speed ratio $i_s$ into zero.

Describing a line pressure control system, first an engine torque T is obtained from a table parameterizing signals θ from the throttle opening sensor 34 and signals from $N_E$ from the engine speed sensor 33. Further, in a desired line pressure establishing section 46 a desired line pressure $P_{LU}$ per unit torque is obtained from a map parameterizing signals of the actual position e sent from the actual pulley position converting section 39. Then, the desired line pressure $P_{LU}$ and the engine torque T are inputted to a target Line pressure calculating section 48 for calculating a target line pressure $P_L$ therein.

On the other hand, when a discharge pressure of the oil pump 10 is changed in accordance with the engine speed, a maximum value of the line pressure is also changed. A maximum line pressure $P_{LM}$ is retrieved from a map parameterizing the engine speed $N_E$ and the actual pulley position e in a maximum line pressure retrieving section 47. Thus, the maximum line pressure $P_{LM}$ corresponding to a certain engine speed $N_E$ at a certain pulley position e is obtained. These data of the target line pressure $P_L$ and the maximum line pressure $P_{LM}$ are inputted to a duty ratio retrieving section, 49 in which a ratio of the target line pressure $P_L$ to the maximum line pressure $P_{LM}$ is obtained and further therein a duty ratio D corresponding to the target line pressure $P_L$ is retrieved from a map. The retrieved duty ratio D is sent to a drive section 50 through which the solenoid operated on-off valve 17 is driven so as to control the line pressure.

The aforementioned control for AT mode is almost the same as the one used in the known continuously variable transmission.

Next, the control system for MT mode will be described.

Referring to FIG. 2, when the select Lever 21a is operated from the D range position of the selector array 22 for AT mode to the selector array 23 for MT mode and passes through the AT-MT gateway 24, the change-over switch 26 detects this and generates a change-over signal from AT to MT mode. The change-over signal is inputted to a fixed speed ratio establishing section 51 for changing the transmission mode from AT to MT mode.

Since the target speed ratio $i_s$ of this moment is inputted to the fixed speed ratio establishing section 51, when the change-over signal from AT to MT is inputted thereto, the fixed speed ratio establishing section 51 outputs a signal for fixing the target speed ratio $i_s$ of that moment as an initial fixed target speed ratio to a target speed ratio switching section 52. In the target pulley position converting section 38, a target pulley position $e_s$ corresponding to that initial fixed target speed ratio is determined by referring to a map. After that, the processes presented in numerals 39 through 44 of FIG. 2 are carried out in the same manner as those in AT mode. That is, the solenoid operated valve 18 is operated so as to equalize the actual pulley position e with the target pulley position $e_s$ corresponding to the initial fixed target speed ratio.

Next, when the up-shift switch 27 or the down shift switch 28 is turned on by the operation of the select lever 21a, an up-shift signal or a down-shift signal is inputted to the fixed speed ratio establishing section 51. The fixed speed ratio establishing section 51 selects a nearest shift position in the up-shift direction or in the down-shift direction and outputs a signal of the speed ratio (fixed target speed ratio) corresponding to the selected shift position to the target speed ratio switching section 52, wherein that speed ratio is converted into a target pulley position $e_s$. Similarly to abovementioned, the solenoid operated valve 18 is operated so as to equalize the actual pulley position e with the target pulley position e corresponding to the fixed target speed ratio.

Hereinafter, each time up-shift or down-shift signals are outputted by the operation of the select lever 21a, the shift position of the transmission goes up or down by one speed range and a speed ratio corresponding to the speed range is fixed as a fixed target speed ratio. Then, the solenoid operated valve 18 is operated so as to equalize the actual pulley position e with the target pulley position $e_s$ corresponding to that fixed target speed ratio.

Thus, when MT mode is selected, a vehicle driver can choose any speed range of transmission freely among a plurality of predetermined speed ranges by operating the select lever manually.

Figure 3:
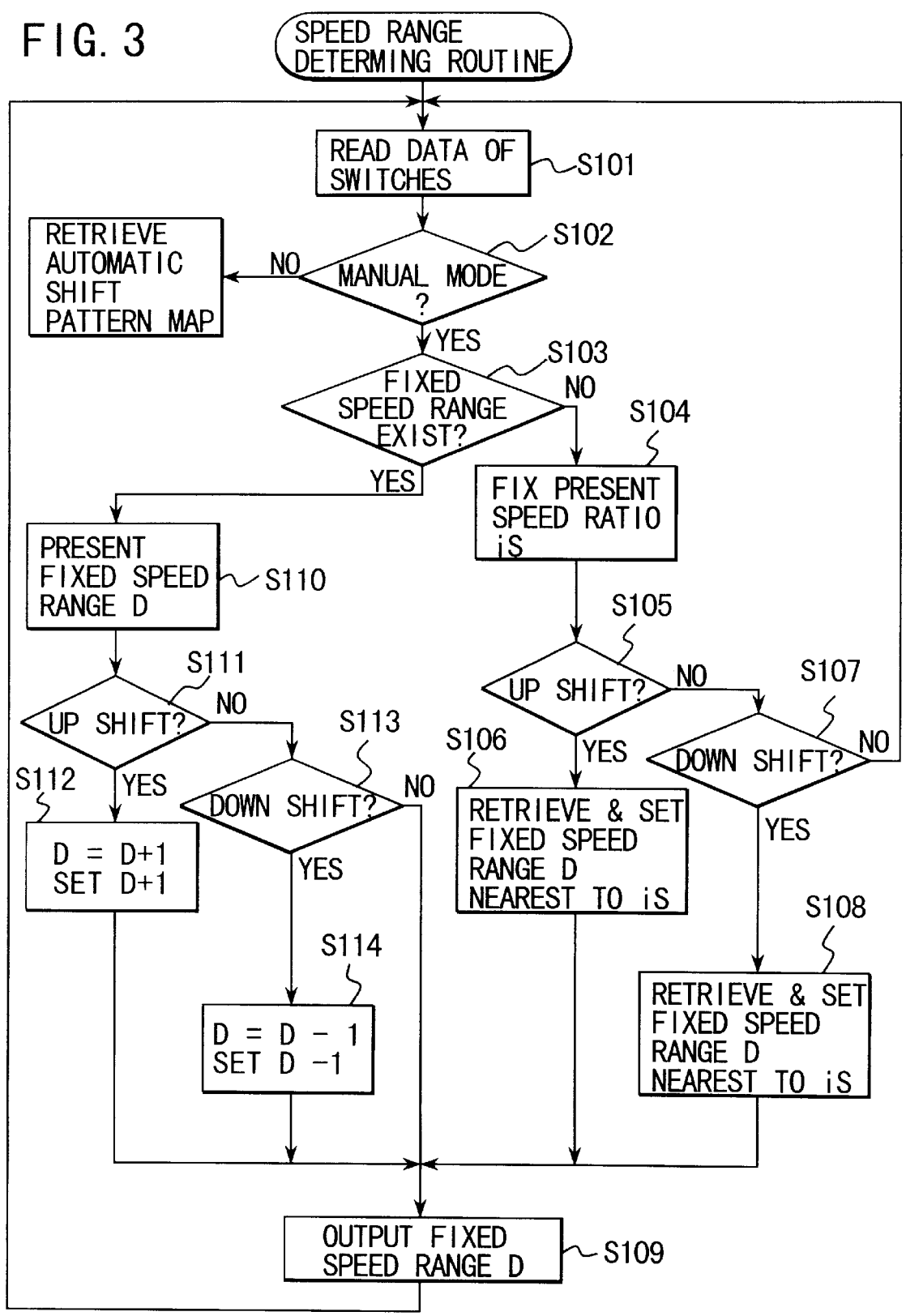
FIG. 3 is a flowchart of a routine for establishing a speed range in MT mode.

Next, the control when MT mode is selected will be described with reference to a flowchart in FIG. 3.

At S101, signals are read from the inhibitor switch 25, the change-over switch 26, the up-shift switch 27 and the down-shift switch 28 provided in the selector unit 21. Then, the program goes to S102 where it is judged whether or not MT mode is selected. If MT mode is selected, the program goes to S103 where it is judged whether the fixed speed range D exists or not. If the fixed speed range D does not exists, the program goes to S104 where the present speed ratio $i_s$ is fixed. Then, it is judged at S105 or S107 whether or not an up-shift signal or a down-shift signal is outputted. If an up-shift signal or a down-shift signal is outputted, the program goes to S106 or S108 where a nearest fixed speed range is selected and at S109 the nearest fixed speed range D is outputted to the target speed ratio switching section 52. Thus, the present fixed speed range D is established at S110, when an up-shift signal or a down-shift signal is outputted by the operation of the select lever 21a.

After the present fixed speed range D is established, the program goes to either S111 or S113. If an up-shift signal is outputted at S111, the program goes to S112 where the present fixed speed range D steps up by one speed range and a new fixed speed range is established as D+1. On the other hand, if a down-shift signal is outputted at S113, the program goes to S114 where the present fixed speed range D steps down by one speed range and a new fixed speed range is established as D-1. Then, at S109 the new fixed speed range D+1 or D-1 is outputted to the target speed ratio switching section 52.

Whenever a vehicle driver operates the select lever 21a back to the selector array 22 for AT mode, the change-over switch 26 is changed over from MT mode to AT mode and the running mode is returned to AT mode.

Figure 5:
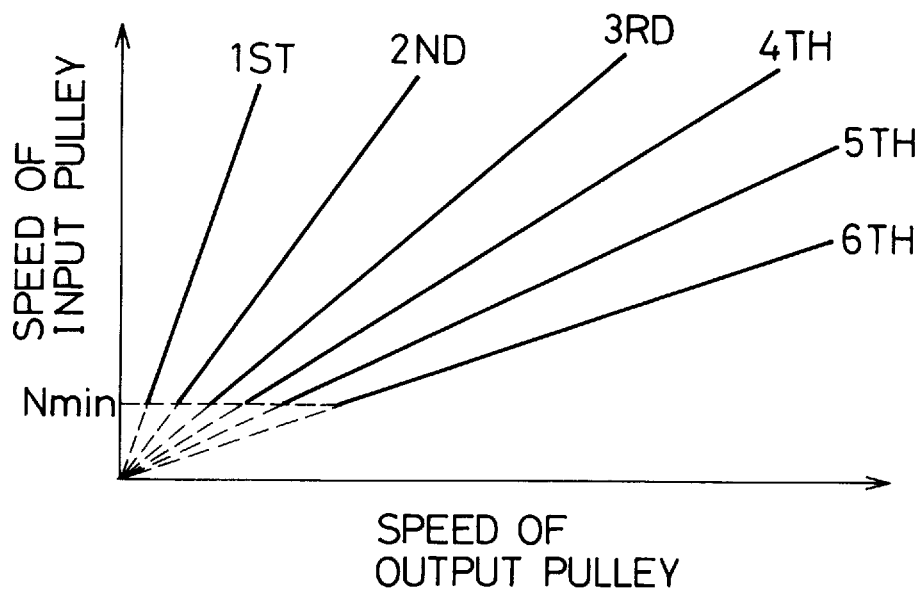
FIG. 5 is a diagram showing an example of a set of speed ranges according to a prior art.

Referring to FIG. 5, this is a drawing showing an example of the input-output characteristic when MT mode is selected in a continuously variable transmission according to the prior art. In this example, six fixed speed ranges are predetermined for MT mode and when MT mode is selected the vehicle is manually controlled according to these fixed speed ranges. However, as indicated in this input-output characteristic diagram, since the input pulley speed has a linear relationship with the output pulley speed, an inexperienced vehicle driver may feel difficulties in making an up-shift or a down-shift with appropriate timing like a case where gear changes are made in a manual transmission.

That is to say, since engine torque generally has a peak at 3000 to 4000 rpm of engine speeds and it goes down at higher engine speeds than that, acceleration performance is enhanced by shifting up in a high speed range direction. On the other hand, this shifting-up can prevent an over-revolution of engine when engine brakes are applied at a low speed range. Further, in high speed ranges, especially in a highest speed range, the coverage of vehicle speed is so narrow that in some cases this highest speed range does not cover an attainable highest vehicle speed. In this case, the attainable highest vehicle speed can be obtained rather by slightly shifting down.

Applying these ideas to the present invention, a set of speed ratios for MT mode is established such that in low speed ranges the speed ratio is forced to be changed in an up-shift direction as the input pulley speed (primary pulley speed) is increased and in high speed ranges the speed ratio is forced to be changed in a down-shift direction as the output pulley speed (secondary pulley speed) is increased.

Figure 4:
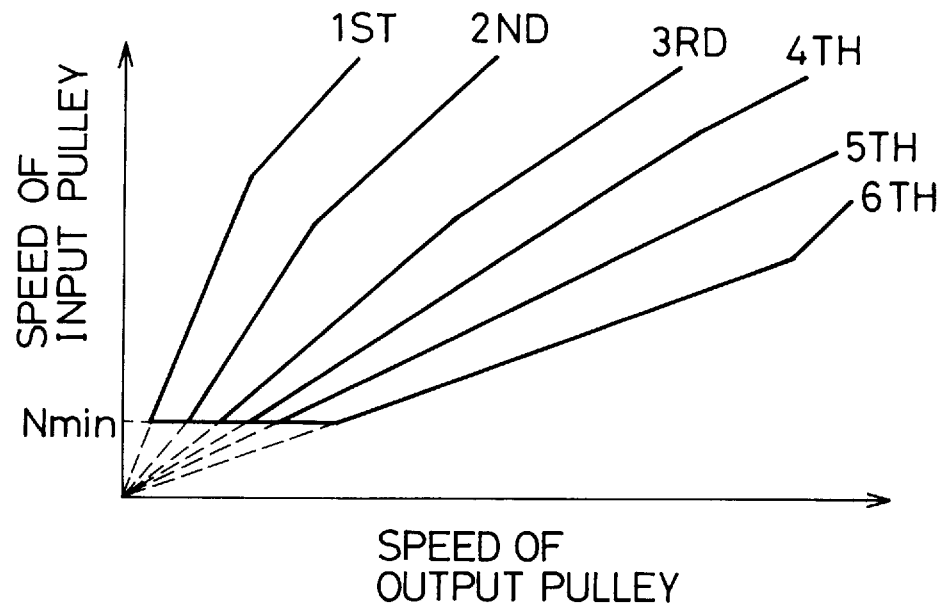
FIG. 4 is a diagram showing an example of a set of speed ranges according to the present invention.

For example, FIG. 4 is an example of a map including a set of modified speed ranges in MT mode. This example shows an MT mode comprising six (6) speed ranges in the relationship between the input pulley speed (primary pulley speed) and the output pulley speed (secondary pulley speed). As indicated in FIG. 4, each of speed ranges from 1st to 6th is modified so that low speed ranges (1st to 4th) are bent in the up-shift direction as the input pulley speed becomes high and the high speed range (6th) is bent in the down-shift direction as the output pulley speed becomes high. The number of bending points may be more than one per one speed range.

The pattern of speed ratios as described above is stored on a map in the fixed speed ratio establishing section 51. When up-shift or down-shift signals are inputted, a speed ratio pattern corresponding to the selected speed range is retrieved from the map and a fixed target speed range is determined from that pattern based on signals of the primary pulley speed $N_P$, the secondary pulley speed $N_S$ and the throttle opening angle $\theta$. Thus determined fixed target speed is outputted to the target speed ratio converting section 52 in which the solenoid operated valve 18 is operated so as to equalize the target pulley position $e_s$ corresponding to the fixed target speed ratio with the actual pulley position e.

Since each of speed ratios for MT mode is established such that in Low speed ranges the speed ratio is forced to be changed in the up-shift direction as the input pulley speed, i.e., the engine speed is increased and in high speed ranges, when the engine speed exceeds the torque peak speed (normally 3000 to 4000 rpm) during acceleration, the speed ratio is changed automatically so as to recover the torque peak speed, whereby the acceleration performance of the vehicle can be prevented from being lowered. That is to say, the coverage of a speed range (in this example, 1st, 2nd, 3rd and 4th) can be expanded. Further, when an engine brake is applied, an increase of the engine speed is suppressed, whereby a smooth deceleration can be obtained. Further, since in high speed ranges the speed ratio is forced to be changed in the down-shift direction as the output pulley speed (vehicle speed) is increased, the maximum speed attained by the maximum speed (in this case 6th) can be extended.

In the exampled map shown in FIG. 4, each speed range is composed of two straight lines with one bending point. In this example, each speed range may be composed of more than two straight Lines. For another example, however, it may be composed of such curves or such combinations of curves and straight lines as in Low speed ranges the speed ratio is gradually changed in the up-shift direction as the input pulley speed (engine speed) is increased and in high speed ranges the speed ratio is gradually changed in the down-shift direction as the output pulley (vehicle speed) speed is increased.

Further, in Lieu of maps, above straight lines or curves may be expressed in linear expressions or other numerical equations from which a fixed target speed ratio is calculated based on signals of the selected speed range, the primary pulley speed $N_p$ and the secondary pulley speed $N_S$ respectively.

Further, in the prior art when the vehicle is decelerated along the speed range without making a down-shift and the input pulley speed (engine speed) reaches a lower limit of engine speed, the speed range is changed from a speed range to a next lower speed range in a sawtooth shape as shown in FIG. 5, this step change causing shift-shocks.

To improve this phenomenon, the control mechanism according to the present invention is constituted such that when the input pulley speed (engine speed) reaches the lower limit, as illustrated in FIG. 4, the target speed ratio can be controlled in such a way that the input pulley speed is maintained to be constant corresponding to the lower limit of engine. As a result of this, since the speed ratio is changed continuously, no shift-shocks occur.

Further, the continuously variable transmission to which the present invention is applied is not limited to the belt and pulley type as described in this embodiment. Further, the electromagnetic powder clutch 2 in this embodiment may be replaced with other types of clutch, such as a lock-up type torque converter, a wet type hydraulic clutch and the like.

In summary, according to the present invention, in the continuously variable transmission having a MT mode, i.e., capable of manually making an up-shift or down-shift among a plurality of predetermined speed ranges, since the speed ratio of each speed range is established so as to change in the up-shift direction with an increase of engine speed on low speed ranges side, engine torque can be so effectively that the acceleration performance is substantially improved and further, when a down-shift is made during deceleration, a smooth deceleration performance can be obtained. Further, since the speed ratio of each speed range is established so as to change in the down-shift direction with an increase of vehicle speed on high speed ranges side, the maximum vehicle speed which can be attained with the highest speed range can be raised. Thus, when a vehicle driver selects an MT mode in the continuously variable transmission, a more sports-like and more comfortable driving can be obtained without using any special techniques.

Further, when the engine speed reaches a lower limit at MT mode, the speed range goes down along the lower limit in the down-shift direction automatically. Consequently, the MT mode according to the present invention is superior to the prior art in which the speed ratio is changed discontinuously when the engine speed reaches a lower limit.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control system of a continuously variable transmission having an automatic transmission mode, a manual transmission mode, said automatic transmission mode for controlling a speed ratio so as to equalize to a target speed ratio determined at least based on an engine speed, a vehicle speed and a throttle opening angle, said manual transmission mode when a speed range is selected manually among a plurality of predetermined speed ranges in order to make an up-shift or a down-shift for controlling said speed ratio so as to become equal to a specified speed ratio of said speed range, comprising:

a change-over switch for outputting a signal when said automatic transmission mode is changed to said manual transmission mode; and speed ratio changing means responsive to said signal for changing said specified speed ratio of said manually selected speed range according to said engine speed; and wherein when said engine speed reaches a lower limit value without making said down-shift, said speed ratio is controlled so as to hold said engine speed at said lower limit value.

2. A control system of a continuously variable transmission having an automatic transmission mode, a manual transmission mode, said automatic transmission mode for controlling a speed ratio so as to equalize to a target speed ratio determined at least based on an engine speed, a vehicle speed and a throttle opening angle, said manual transmission mode when a speed range is selected manually among a plurality of predetermined speed ranges in order to make an up-shift or a down-shift for controlling said speed ratio so as to become equal to a specified speed ratio of said speed range, comprising:

a change-over switch for outputting a signal when said automatic transmission mode is changed to said manual transmission mode; and speed ratio changing means responsive to said signal for changing said specified speed ratio of said manually selected speed range according to said vehicle speed; and wherein when said engine speed reaches a lower limit value without making said down-shift, said speed ratio is controlled so as to hold said engine speed at said lower limit value.

3. A control system of a continuously variable transmission having an automatic transmission mode, a manual transmission mode, said automatic transmission mode for controlling a speed ratio so as to equalize to a target speed ratio determined at least based on an engine speed, a vehicle speed and a throttle opening angle, said manual transmission mode when a speed range is selected manually among a plurality of predetermined speed ranges in order to make an up-shift or a down-shift for controlling said speed ratio so as to become equal to a specified speed ratio of said speed range, comprising:

a change-over switch for outputting a signal when said automatic transmission mode is changed to said manual transmission mode; and speed ratio changing means responsive to said signal for changing said specified speed ratio of said manually selected speed range in the up-shift direction as said engine speed becomes high on the side of low speed ranges and in the down-shift direction as said vehicle speed becomes high on the side of high speed ranges.

4. The system according to claim 3, wherein when said engine speed reaches a lower limit value without making said down-shift, said speed ratio is controlled so as to hold said engine speed at said lower limit value.

5. A control method of a continuously variable transmission having an automatic transmission mode, a manual transmission mode, said automatic transmission mode for controlling a speed ratio so as to equalize to a target speed ratio determined at least based on an engine speed, a vehicle speed and a throttle opening angle, said manual transmission mode when a speed range is selected manually among a plurality of predetermined speed ranges in order to make an up-shift or a down-shift for controlling said speed ratio so as to become equal to a specified speed ratio of said speed range, comprising the steps of:

outputting a signal when said automatic transmission mode is changed to said manual transmission mode; and responsive to said signal changing said specified speed ratio of said manually selected speed range in the up-shift direction as said engine speed becomes high on the side of low speed ranges and in the down-shift direction as said vehicle speed becomes high on the side of high speed ranges.

6. A control system of a continuously variable transmission having an automatic transmission mode, a manual transmission mode, said automatic transmission mode for controlling a speed ratio so as to equalize to a target speed ratio determined at least based on an engine speed, a vehicle speed and a throttle opening angle, said manual transmission mode when a speed range is selected manually among a plurality of predetermined speed ranges in order to make an up-shift or a down-shift for controlling said speed ratio so as to become equal to a specified speed ratio of said speed range, comprising the steps of:

outputting a signal when said automatic transmission mode is changed to said manual transmission mode; and responsive to said signal changing said specified speed ratio of said manually selected speed range according to said engine speed; and when said engine speed reaches a lower limit value without making said down-shift, said speed ratio is controlled so as to hold said engine speed at said lower limit value.

7. A control system of a continuously variable transmission comprising:

a selecting device which selects one of a plurality of speed ranges to simulate a manual transmission;

a controlling device which controls an actual transmission ratio in the transmission in accordance with a predetermined transmission ratio pattern of said one speed range selected by said selecting device; and said predetermined transmission ratio pattern having a plurality of transmission ratios for the actual transmission ratio depending on engine speed and vehicle speed respectively.

8. The control system according to claim 2, wherein:

said predetermined transmission ratio pattern changes in an up-shift direction as said engine speed becomes high in a lower speed range.

9. The control system according to claim 7, wherein:

said predetermined transmission ratio pattern changes in an up-shift direction as said vehicle speed becomes high in a lower speed range.

10. The control system according to claim 8, wherein:

said predetermined transmission ratio pattern changes in a down-shift direction as said engine speed becomes high in a higher speed range.

11. The control system according to claim 7, wherein:

said predetermined transmission ratio pattern changes in a down-shift direction as said vehicle speed becomes high in a higher speed range.

12. The control system according to claim 7, wherein:

when said engine speed reaches a lower limit value without making a down-shift, said actual transmission ratio is controlled so as to hold said engine speed at said lower limit value.

13. A control system of a continuously variable transmission, comprising:

a selecting device which selects one of plurality of speed ranges to simulate a manual transmission; and a controlling device which controls an actual transmission ratio in the transmission in accordance with a predetermined transmission ratio pattern of said one speed range selected by said selecting device; and said predetermined transmission ratio pattern being formed in a non-linear curve.

14. A control system of a continuously variable transmission having an automatic transmission mode, and a manual transmission mode, said automatic transmission mode for controlling an actual transmission ratio so as to become equal to a target transmission ratio determined at least based on engine speed, vehicle speed and throttle opening angle, said manual transmission mode when a speed range is selected manually among a plurality of predetermined speed ranges in order to make an up-shift or a down-shift for controlling said actual transmission ratio so as to become equal to a predetermined transmission ratio of said speed range, comprising:

a change-over switch for outputting a signal when said automatic transmission mode is changed to said manual transmission mode; and transmission ratio changing means responsive to said signal for changing said predetermined transmission ratio of said manually selected speed range in the up-shift direction as said engine speed becomes high in lower speed ranges and in the down-shift direction as said vehicle speed becomes high in higher speed ranges.

15. The system according to claim 14, wherein when said engine speed reaches a lower limit value without making said down-shift, said actual transmission ratio is controlled to as to hold said engine speed at said lower limit value.

\* \* \* \* \*